United States Patent Office 3,414,569
Patented Dec. 3, 1968

3,414,569
ETHYLENICALLY UNSATURATED QUATERNARY AMMONIUM HYDRAZIDES AND THEIR PREPARATION
Horst Wieden, Dormagen, Helmut Kleiner, Cologne-Stammheim, Jenö Szita, Dormagen, and Günther Nischk, Leverkusen, Germany, assignors to Farbenfabriken Bayer Aktiengesellschaft, Leverkusen, Germany, a German corporation
No Drawing. Filed Feb. 9, 1965, Ser. No. 431,432
Claims priority, application Germany, Feb. 21, 1964, F 42,080
12 Claims. (Cl. 260—247.1)

ABSTRACT OF THE DISCLOSURE

Ethylenically unsaturated quaternary ammonium compounds of the formula

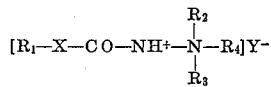

in which $R_1$ is alkenyl (e.g. $C_{2-3}$ alkenyl) or aralkenyl (e.g. styryl); X is a direct bond or

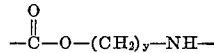

wherein y is a whole number from 2 to 4; $R_2$ and $R_3$ each is alkyl (e.g. $C_{1-3}$ alkyl); $R_2$ and $R_3$ when taken together forming an alkylene radical optionally containing hetero atoms (e.g. morpholino); $R_4$ is alkyl (e.g. $C_{1-4}$ alkyl) or benzyl; $Y^-$ is the anion of an aromatic sulfonic acid (e.g. benzene or toluene sulfonic acid), of a monoalkyl sulfuric acid (e.g. monomethyl sulfuric acid) or of a hydrohalic acid; and $R_4$ and $Y^-$ when taken together representing the anion of an aliphatic sulfobetaine (e.g. having 3–4 alkyl carbon atoms); produced by reacting a corresponding $C_{3-4}$ aliphatic sultone or organic alkyl or benzyl ester (e.g. an aromatic sulfonic acid ester, a monoalkyl sulfuric acid ester or a hydrohalic acid ester having an $R_4$ group as ester moiety), with an unsaturated N,N-disubstituted acid hydrazide of the formula

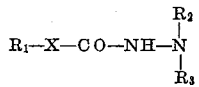

in which $R_1$, X, $R_2$ and $R_3$ are the same as defined above, in a liquid medium, e.g. at a temperature between 0 to 150° C., and separating the formed ethylenically unsaturated quaternary ammonium compound from the reaction medium; and being capable of improving considerably the anti-static properties of high molecular weight polymers.

---

This invention relates to novel ethylenically unsaturated quaternary ammonium compounds and to a process of preparing them.

It is known that aliphatic sultones react with compounds containing a labile hydrogen atom to form the corresponding ω-sulphonic acids. If tertiary amines are used, sulphonic acid betaines are formed. It is also known that tertiary amines may be converted into quaternary ammonium compounds by reaction with organic esters of sulphuric acid or of the hydrohalic acids.

It has now been found that ethylenically unsaturated quarternary ammonium compounds may be obtained by reacting organic esters of sulphuric acid or of the hydrohalic acids at temperatures in the range from 0 to 150° C., optionally in an organic solvent, with unsaturated N,N-disubstituted acid hydrazides or semi-carbazides of the general Formula I:

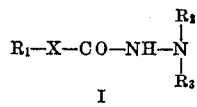

wherein $R_1$ represents an alkenyl radical or an aralkylene i.e. aralkenyl radical, X represents a direct bond or the radical

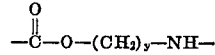

in which y represents a number from 2 to 4, and $R_2$ and $R_3$ represent individual alkyl radicals or, together, an alkylene radical which may optionally include hetero atoms.

The following are examples of the compounds which may be used as the starting compounds of Formula I: N,N-dialkylated acid hydrazides of unsaturated carboxylic acids, such as acrylic acid, N,N-dimethyl hydrazide, methacrylic acid, N,N-dimethyl hydrazide, crotonic acid, N,N-diethyl hydrazide, cinnamic acid, N,N-dimethyl hydrazide and methacryloyl amino morpholine, and N,N-dialkylated semicarbazides of unsaturated carboxylic acids, such as $N^1$-β-acryloyloxyethyl $N^3,N^3$-dimethyl semicarbazide of the formula:

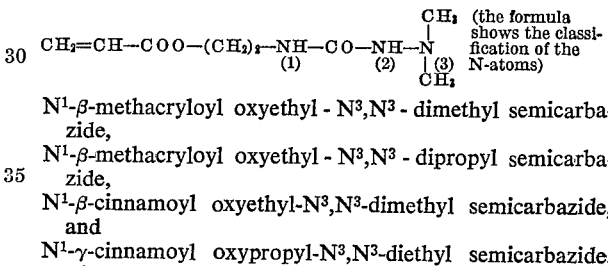

$N^1$-β-methacryloyl oxyethyl - $N^3,N^3$ - dimethyl semicarbazide, $N^1$-β-methacryloyl oxyethyl - $N^3,N^3$ - dipropyl semicarbazide, $N^1$-β-cinnamoyl oxyethyl-$N^3,N^3$-dimethyl semicarbazide, and $N^1$-γ-cinnamoyl oxypropyl-$N^3,N^3$-diethyl semicarbazide.

The afore-mentioned compounds may be obtained, for example, from the corresponding N,N-disubstituted hydrazines by reaction with unsaturated acid halides, acid anhydrides or the corresponding unsaturated carboxylic acid-ω-isocyanato-alkylene esters, such as β-isocyanato-ethyl methacrylate, β-isocyanato-ethyl acrylate and γ-isocyanato-propyl cinnamate.

The following are examples of the organic esters of sulphuric acid and the hydrohalic acids which may be used: alkyl esters of aromatic sulphonic acids, such as methyl benzene sulphonate, and ethyl toluene sulphonate, dialkyl esters of sulphuric acid, such as dimehtyl sulphate, aliphatic sultones, such as propane-1,3-sultone, methyl propane-1,3-sultone and butane-1,4-sultone, alkyl esters and aralkyl esters of hydrohalic acids, such as methyl iodide, methyl, ethyl, propyl and butyl bromide or benzyl chloride. Hydrocarbons, such as benzene and toluene, or alcohols such as methanol or ethanol, may in particular be employed as the solvent.

The novel ethylenically unsaturated quaternary ammonium compounds which may be produced according to the process as indicated above correspond to the general formula:

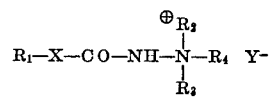

wherein $R_1$, $R_2$, $R_3$ and X have the meanings given above, $R_4$ represents an alkyl radical and $Y^-$ represents the anion of an aromatic sulphonic acid, a monoalkyl sulphuric acid or a hydrohalic acid, or $R_4$ and $Y^-$ together represents the anion of an aliphatic sulphobetaine.

The process according to the invention is carried out at temperatures in the range from 0 to 150° C., preferably from 20 to 100° C. To carry out the process, the starting Compound I may, for example be dissolved or suspended in one of the solvents referred to, and the ester added, either slowly or all at once, to the reaction mixture at the necessary reaction temperature. The corresponding quaternary ammonium salts generally precipitate at the end of the reaction and may be isolated. If highly-reactive starting materials are used, it is advisable to carry out the reaction in the presence of polymerisation stabilisers, such as hydroquinone, t-butyl pyrocatechol or phenthiazine.

It was surprising that the reaction according to the invention led to the formation of uniform monomeric compounds. In addition to the tertiary nitrogen atom, the starting compounds of Formula I contain at least one other nitrogen atom which carries readily-replaceable hydrogen atoms. For this reason, it was to be expected that this nitrogen atom would take part in the reaction leading to the formation of completely indefinable products would have been obtained.

The new compounds may be used in the preparation of pharmaceutical products. In addition, the antistatic properties of high molecular weight polymers may very considerably be improved by admixture with these compounds. The following examples illustrate the invention in particular.

Example 1

53.8 parts by weight of $N^1$-$\beta$-methacryloyl-oxy-ethyl-$N^3$,$N^3$-dimethyl semicarbazide and 0.45 parts by weight of hydroquinone were suspended in 180 parts by volume of toluene, and then mixed with 33.6 parts by weight of propane-1,3-sultone. The mixture was heated to 100° C. with stirring for 2 hours. A clear reaction solution was temporarily obtained. After a short time, however, precipitation of the sulphobetaine

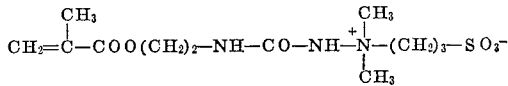

began. After standing for 8 to 10 hours at 100° C., the solution was cooled to room temperature, and the precipitated sulphobetaine was suction-filtered. The white crystals which decomposed on melting were recrystallised from methanol/water. Yield: 63 parts by weight (75% Th).

$C_{12}H_{23}N_3O_6S$, calculated: N, 12.46; S, 9.50. Found: N, 12.57; S, 9.25.

Preparation of the starting compound

A mixture of 61.2 parts by weight of N,N-dimethyl hydrazine and 300 parts by volume of petroleum ether was added dropwise at 5 to 10° C. with slow stirring to a solution of 155 parts by weight of $\beta$-isocyanato-ethyl methacrylate and 0.13 part by weight of phenthiazine in 400 parts by volume of petroleum ether. External cooling was then stopped and stirring was continued for 2 hours. The precipitated $N^1$-$\beta$-methacryloyl-oxyethyl-$N^3$, $N^3$-dimethyl semicarbazide was suction-filtered and recrystallised from benzene/petroleum ether. Yield: 194 parts by weight.

Example 2

50.3 parts by weight of $N^1$-$\beta$-acryloyl-oxyethyl-$N^3$,$N^3$-dimethyl semicarbazide and 0.84 part by weight of hydroquinone were dissolved in 200 parts by volume of toluene. 33.6 parts by weight of propane-1,3-sultone were added to the solution which was then heated for 10 hours at 100° C. with vigorous stirring. The reaction was carried out under nitrogen. The precipitated, unsaturated sulphobetaine:

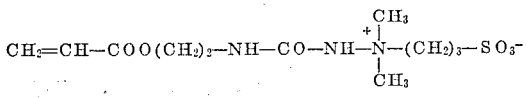

was suction-filtered and recrystallised from methanol/water. Yield: 58.2 parts by weight (72% Th).

$C_{11}H_{21}N_3O_6S$, calculated: N, 13.00; S, 9.92. Found: N, 13.16, S, 9.73.

Example 3

53.8 parts by weight of $N^1$-$\beta$-methacryloyl-oxyethyl-$N^3$,$N^3$-dimethyl semicarbazide and 3 parts by weight of hydroquinonl were dissolved in 300 parts by volume of toluene at 60° C. under nitrogen. A solution of 51.2 parts by weight of methyl p-toluene sulphonate in 150 parts by volume of toluene was added dropwise to this solution. The resulting solution was heated to 100° C. with intensive stirring and, after standing for 5 to 6 hours at 100° C., was cooled to room temperature.

The quaternised, unsaturated semicarbazide

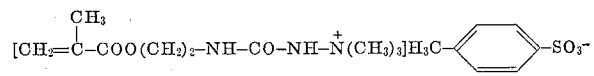

which was initially precipitated from the toluene as an oil, crystallised slowly. It was suction-filtered and recrystallised from benzene/cyclohexane. The white crystals decomposed on melting. Yield: 86.9 parts by weight (86% Th).

$C_{17}H_{27}N_3O_6S$, calculated: N. 10.47; S, 7.97. Found N, 10.58; S, 7.90.

Example 4

50.3 parts by weight of $N^1$-$\beta$-acryloyl-oxyethyl-$N^3$,$N^3$-dimethyl semicarbazide and 2 parts by weight of hydroquinone were dissolved in 400 parts by volume of toluene. 51.2 parts by weight of methyl p-toluene sulphonate were added to the solution which was then heated for 6 hours at 100° C. in a nitrogen atmosphere with intensive stirring.

The quaternised, unsaturated semicarbazide

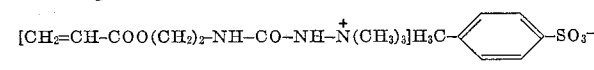

which precipitated as an oil, crystallised slowly. It was recrystallised from benzene/petroleum ether. Yield: 75.5 parts by weight (78% Th).

$C_{16}H_{25}N_3O_6S$, calculated: N, 10.85; S, 8.26. Found: N, 10.61; S, 8.09.

Example 5

11.4 parts by weight of acrylic acid-N-N-dimethyl hydrazide and 0.1 part by weight of hydroquinone were dissolved in 100 parts by volume of benzene and mixed with 12.6 parts by weight of dimethyl sulphate. Quaternisation began immediately and was accompanied by a rise in temperature to 40° C. There was an oily precipitate. The solution was stirred for a further 30 minutes at 50° C. and then cooled. The oily quaternisation product, 15 parts by weight (74% Th), was separated out.

The reaction product had the following formula:

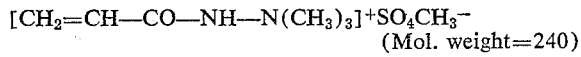

(Mol. weight=240)

and was readily soluble in water.

Example 6

17 parts by weight of N-methacryloyl aminomorpholine were dissolved in 100 parts by volume of chlorobenzene and 0.2 parts by weight of hydroquinone were added. 12.6 parts by weight of dimethyl sulphate were slowly added dropwise to the solution at 100° C. with stirring. The product of quaternisation precipitated as an oil. The solvent was removed by decantation and the precipitated oil was extracted several times by stirring with benzene and finally with petroleum ether. It was then dried at 50° C. in a 15 mm. vacuum. The yield comprised 29 parts by weight (98% Th) of quaternary reaction product which was readily soluble in water and had the following formula:

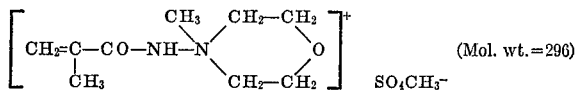 (Mol. wt.=296)

Example 7

To a solution of 192 parts of weight of methacrylic acid-N,N-dimethylhydrazide and 4 parts by weight of hydroquinone in 1200 parts of volume of toluene were added with stirring 201 parts by weight of propanesultone-1,3 at a temperature of 0° C. After withdrawing the cooling, the temperature rises to room temperature and this temperature is held for 20 hours. Then, the reaction mixture is heated for 24 hours at a temperature of 90° C. The precipitated crystals of the quaternisation product

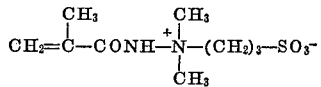

were suction-filtered and washed with ethyl alcohol. Yield: 320 parts by weight (85% Th).

$C_9H_{18}N_2O_4S$, calculated: N, 11.19; S, 12.81. Found: N, 10.98; S, 12.73.

Example 8

According to Example 7, 256 parts by weight of methacrylic acid-N,N-dimethylhydrazide were reacted with 300 parts by weight of butanesultone-1,4 in the presence of 6 parts by weight of hydroquinone in 840 parts by volume of toluene. Yield: 412 parts by weight (78% Th) of a sulfobetaine having the formula

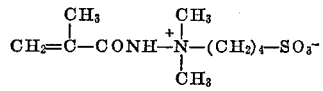

$C_{10}H_{20}N_2O_4S$, calculated: N, 10.59; S, 12.13. Found: N, 10.67; S, 12.09.

What we claim is:

1. The sulfobetaine having the formula

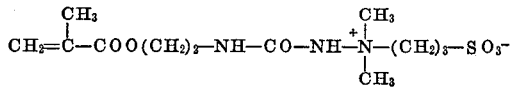

2. The sulfobetaine having the formula

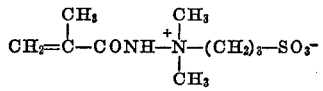

3. The sulfobetaine having the formula

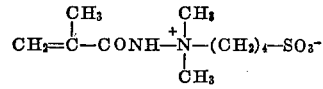

4. The quaternized, unsaturated semicarbazide having the formula

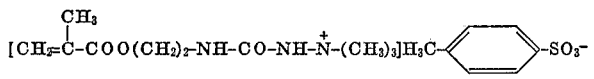

5. The quaternary ammonium compound having the formula

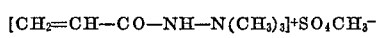

6. The quaternary ammonium compound having the formula

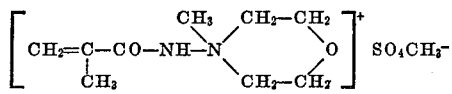

7. A compound of the formula

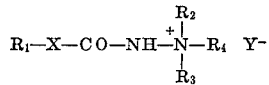

in which $R_1$ is selected from the group consisting of $C_{2-3}$ alkenyl and styryl radicals, X is selected from the group consisting of a direct bond and the radical

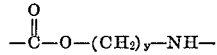

wherein y is a whole number from 2 to 4, $R_2$ and $R_3$ each respectively is a $C_{1-3}$ alkyl radical, $R_2$ and $R_3$ together with the adjacent nitrogen atom form, $R_4$ is selected from the group consisting of $C_{1-4}$ alkyl and benzyl radicals, and $Y^-$ is the corresponding anion of an organic acid selected from the group consisting of benzene sulfonic acid, toluene sulfonic acid, monomethyl sulfuric acid and a hydrohalic acid, and $R_4$ and $Y^-$ when taken together representing the corresponding anion lof a $C_{3-4}$ alkyl sulfobetaine.

8. Process for producing a compound of the formula

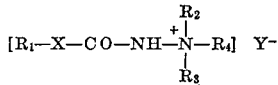

in which $R_1$ is selected from the group consisting of $C_{2-3}$ alkenyl and styryl radicals, X is selected from the group consisting of a direct bond and the radical

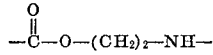

$R_2$ and $R_3$ each respectively is a $C_{1-3}$ alkyl radical, $R_2$ and $R_3$ together with the adjacent nitrogen atom form, morpholino, $R_4$ is selected from the group consisting of $C_{1-4}$ alkyl and benzyl radicals, and $Y^-$ is the corresponding anion of an organic acid selected from the group consisting of benzene sulfonic acid, toluene sulfonic acid, monomethyl sulfuric acid and a hydrohalic acid, and $R_4$ and $Y^-$ when taken together representing the corresponding anion of a $C_{3-4}$ alkyl sulfobetaine, which comprises reacting an anion-containing compound selected from the group consisting of a $C_{3-4}$ alkyl sultone and an ester selected from the group consisting of a benzene sulfonic acid ester, a toluene sulfonic acid ester, a monomethyl sulfuric acid ester and a hydrohalic acid ester, in which the corresponding ester moiety is represented by the radical $R_4$ as defined above, with an unsaturated N,N-disubstituted acid hydrazide of the formula

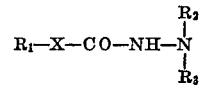

in which $R_1$, X, $R_2$ and $R_3$ are the same as defined above, in a liquid medium at a temperature between 0 to 150° C., and separating the formed ethylenically unsaturated quaternary ammonium compound from the reaction medium.

9. Process according to claim 8 wherein said anion-containing compound is a $C_{3-4}$ alkyl sultone.

10. Process according to claim 8 wherein said anion-containing compound is selected from the group consisting of a benzene sulfonic acid ester, a toluene sulfonic acid ester, and a monomethyl sulfuric acid ester, in which the corresponding ester moiety is a $C_{1-4}$ alkyl radical.

11. Process according to claim 8 wherein said anion-containing compound is selected from the group consisting of $C_{1-4}$ alkyl and benzyl esters of hydrohalic acid.

12. Process according to claim 8 wherein the liquid medium is an organic solvent selected from the group consisting of a hydrocarbon and an alcohol.

No references cited.

NICHOLAS S. RIZZO, *Primary Examiner*.

JOSE TOVAR, *Assistant Examiner*.

UNITED STATES PATENT OFFICE
CERTIFICATE OF CORRECTION

Patent No. 3,414,569

December 3, 1968

Horst Wieden et al.

It is certified that error appears in the above identified patent and that said Letters Patent are hereby corrected as shown below:

Column 2, lines 62 to 66, the formula should appear as shown below:

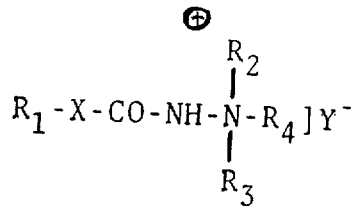

Column 6, lines 3 to 5, the formula should appear as shown below

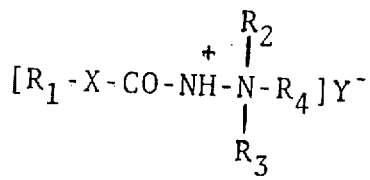

same column 6, line 14, after "form" insert -- morpholino --; line 20, "lof" should read -- of --.

Signed and sealed this 17th day of March 1970.

(SEAL)
Attest:

EDWARD M. FLETCHER, JR.
Attesting Officer

WILLIAM E. SCHUYLER, JR.
Commissioner of Patents